United States Patent [19]

VanDuyn

[11] Patent Number: 4,572,978

[45] Date of Patent: Feb. 25, 1986

[54] COMMUTATOR STUD VIBRATION DAMPING ARRANGEMENT

[75] Inventor: Martin VanDuyn, Peterborough, Canada

[73] Assignee: Canadian General Electric Company Limited, Toronto, Canada

[21] Appl. No.: 628,477

[22] Filed: Jul. 6, 1984

[30] Foreign Application Priority Data

Jun. 20, 1984 [CA] Canada .................................. 457040

[51] Int. Cl.[4] .............................................. H02K 5/24

[52] U.S. Cl. ...................................... 310/51; 248/609; 310/236

[58] Field of Search ................. 310/51, 217, 233, 236; 248/608, 609, 635

[56] References Cited

FOREIGN PATENT DOCUMENTS

| | | | |
|---|---|---|---|
| 650441 | 10/1962 | Canada | 310/51 |
| 1042736 | 11/1958 | Fed. Rep. of Germany | 310/217 |
| 230470 | 7/1925 | United Kingdom | 310/233 |
| 962317 | 7/1964 | United Kingdom | 310/233 |
| 197709 | 9/1977 | U.S.S.R. | 310/217 |

*Primary Examiner*—Peter S. Wong
*Assistant Examiner*—D. L. Rebsch
*Attorney, Agent, or Firm*—Raymond A. Eckersly

[57] ABSTRACT

In a commutator formed by a plurality of commutator bars clamped between an annular shell and a clamping ring held together by studs, the life of the commutator may be extended significantly by imposing a resilient damper between the stud and the inside wall of a passage in the shell or ring, or both. The damper is spaced inwardly from the end of the stud, preferably by an amount approximately equal to one third of the length of the stud.

8 Claims, 3 Drawing Figures

COMMUTATOR STUD VIBRATION DAMPING ARRANGEMENT

FIELD OF THE INVENTION

The present invention relates to a commutator, more particularly to the dampening of a stud bolt resiliently holding the commutator bars between a clamping ring and a shell.

BACKGROUND OF THE PRESENT INVENTION

It is well-known to build commutators utilizing an annular shell and a clamping ring to clamp individual commutator bar5therebetween. Clamping force is generally provided by a set of studs which extend through alined passages in the ring and the shell and to which a preset torque is applied thereby to resiliently clamp the commutator bars in position by forcing the clamping ring towards the shell.

In many cases these studs are simply bolt-like elements designed with threads at either end and a necked-down portion in the center so that prestressing can predict the actual tension on the stud and thus the pressure exerted via the clamping ring on the bars forcing them towards the shell. Such a simple structure is normally applied on narrow commutators i.e. commutators having lengths in the axial direction of say about a foot to about two feet.

When the commutator length or motor speed is increased significantly special studs are used that are supported along their length to prevent deflection and vibration. This support is normally obtained by putting a ring with accurate holes therethrough extending in the axial direction positioned to snugly receive a rigid boss generally at about the mid length of each stud so that the effective length of the stud for vibration purposes is reduced to one half.

Recently a failure has been experienced in a particular installation incorporating a relatively short commutator having a simple stud design with no intermediate support. In this particular installation the motor was operated at low speed under high impact loading in a steel mill to drive the rougher rolls. Surprisingly it was found that the studs after a period of time fractured and upon close examination it was found that the fracture was due to fatigue. Upon testing it was found that the commutator stud assembly had exceptionally low damping which can have serious consequences in that it can result in stresses, generated by a very high percentage of the vibrations, of sufficient magnitude to diminish stud life. This had not been evident based on conventional design criteria used to produce such commutator.

BRIEF DESCRIPTION OF THE PRESENT INVENTION

It is an object of the present invention to provide a commutator structure having an extended stud life.

Broadly the present invention relates to a commutor comprising a plurality of commutator bars set between an annular shell and a clamping ring, stud means biasing said clamping ring towards said shell to resiliently clamp said bars between said clamping ring and said shell, the ring and the shell defining axially extending passages therethrough, each passage in the ring being in axial alinement with a respective passage in the shell and together forming a pair of passages; one of said studs passing through each of said pairs of passages; said passages providing clearance for the stud passing through said passage and a resilient damping means encircling each said stud at a distance spaced from the ends of said stud but located in one of said passages, the clearance between said damping means and the respective passage in which it is received being significantly less than said clearance between the stud and the passage yet permitting free axial movement of the stud through the pair of passages and accommodating some misalinement between the stud and the pair of passages to facilitate assembly; said resilient damping means engaging the side of said passage when said stud is vibrated during operation of said commutator in a manner so as to damp the vibration of said stud when said commutator is in use and significantly reduce any damaging stresses that would otherwise be applied to said stud.

Preferably the damping means will be spaced between about 25 to 40 percent of the length of the stud from the said one end.

It is also possible to use a pair of damping means one positioned within the ring and the other positioned within the shell passage to further dampen vibrations.

When only a single damper structure is used it is preferably received within the passage in the ring, i.e., closer to the end of the stud farthest from the nut, i.e., adjacent the end of the stud having a flange welded thereto.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENT

Figure 1:
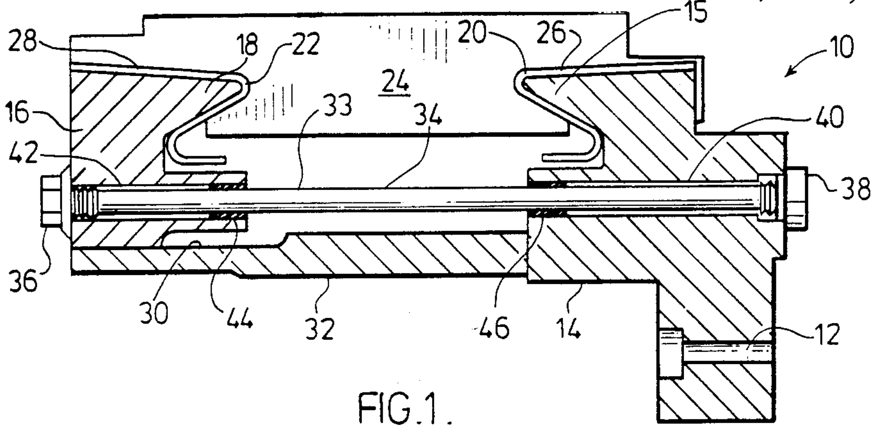
FIG. 1 is a section through a commutator constructed in accordance with the present invention.

As shown in the FIG. 1 the entire commutator 10 may be built as a separate assembly and bolted to the equipment by an annular row of bolts passing through holes 12 arranged as a bolt circle in the annular shell structure 14. The shell structure is provided with a V-shaped outwardly projecting annular section 15 extending around the periphery of shell 14.

A suitable clamp ring 16 is provided with a similar V-shaped projection 18 facing the projection 15. These projections 15 and 18 are received in suitable grooves 20 and 22 in the commutator bars 24 (only one shown). Suitable insulation generally indicated at 26 and 28 is interposed between the commutator bars 24 and the projections 15 and 18 respectively.

It will be apparent that there are a plurality of commutator bars 24 arranged as an annulus around the shaft of the motor in the conventional manner.

In the illustrated arrangement;the clamping ring 16 slides along on an outer annular surface 30 formed on the tubular support member 32 when the bars 24 are being clamped or released.

The ring 16 is clamped to the shell 14 via studs 34 which may be constructed in any suitable manner. Conventionally each stud is formed with a central smaller diameter section 33 and a pair of threaded ends 35 with a flange nut 36 welded to one end and a plug nut 38 threaded on the opposite end. The stud is tightened into the plug nut to squeeze the commutator bars 24 (only one shown) between the projections 18 and 15. Generally for a cummutator of about 15 to 20 inch radius, these studs will be spaced approximately every 4 to 5 inches around the periphery of the commutator 10. Obviously, the specific spacing will vary, depending on the diameter of the commutator, length of the bars, speed of operation, etc.

It will be noted that each stud 34 passes through a pair of passages 40 and 42, one formed in the shell 14 and the other in the ring 16. These passages 40 and 42 form axially alined pairs of passages to receive the studs 34 therethrough (there may in some cases be slight misalinement of these passages which may in some cases result in some difficulty in assembly).

The commutator as described above is known in the art and it was in this particular type of commutator that the problem was encountered, where some to be a fatigue failure.

The present invention comprises the addition of at least one damper means, which in the illustrated arrangement comprises a resilient sleeve or the like snugly encircling the shank of the stud 34 at a distance spaced from the axial ends. Such a damper structure is schematically illustrated at 44.

This damper is made of resilient material which will absorb and dampen vibrations in the stud.

It is important the resilient damper be substantially the same outer diameter as the inner diameter of the passage in which it is retained namely the passage 42. Obviously it cannot be larger if assembly is to be effected easily and a slight clearance is generally preferred, and in some cases may be necessary, to permit insertion of the stud into position. In order to be effective, the clearance between the damper and the inner periphery of the passage 42 must be significantly less than the amplitude of the vibration of the stud at the location of the damper so that the damper is forced against the wall of the passage to dampen out the vibrations.

Obviously, the location of the damper relative to axial ends of the stud is important. It is preferred that the damper be positioned in about 25 to 40 percent of the length of the stud from one end To facilitate assembly it is preferred that if a single damper is used, such as the damper 44, it be located closer to the end of the stud having the welded-on flange nu facilitate alining the stud with the passage 40 and the assembly of the commutator. This also provides maximum protection from fatique at the flange nut end of the stud. Preferably the damper will be 30–35% of the length of the stud from the flange nut, or if two dampers are used, from the adjacent end of the It will be apparent that at least a significant portion of the damper 44 must be received within the passage 42 or alternatively, if the damper is adjacent the opposite end of the stud (damper 46), within the passage 40 as illustrated. A pair of dampers may be used, such as a damper 44, 46 positioned within and cooperating with the passages 42 and 40 respectively. It is found that a single damper is almost as effective as a pair of dampers and thus in many installations only the damper 44 will be used since this damper may be easily alined with the passage 42 and the stud may be more easily passed through the pair of passages 40 and 42 for assembly.

A damper may be of any suitable resilient material such as rubber, polyethylene or the like material but applicant has found that the use of heat shrinkable polyolefin tubing shrunk on the shaft of the stud to be effective with several layers of such tubing being preferred. Natural rubbers may deteriorate quickly due to the presence of ozone and therefore should be avoided.

The thickness of the damper will be sufficient to reduce the clearance between the inside diameter of the passage in which it is retained to a minimum generally no greater than about 0.01 inches, preferably less and should have a radial thickness in the range of 0.040 to 0.125 inches.

The axial length of the dampener should be in the order of 1 to about 5 inches and may extend substantially the full length of the passage and even beyond. For that matter it could extend substantially the full length of the stud provided the proper clearance is maintained between the damper and the passages through which it extends, i.e, in this case there would be single sleeve ext.ending substantially the full length of stud and cooperating with both of the passages 40 and 42. In the preferred arrangement with damper spaced 25 to 40% of the stud length from the ends, the damper will be about $\frac{3}{4}$ to 2 inches long.

Figure 2:
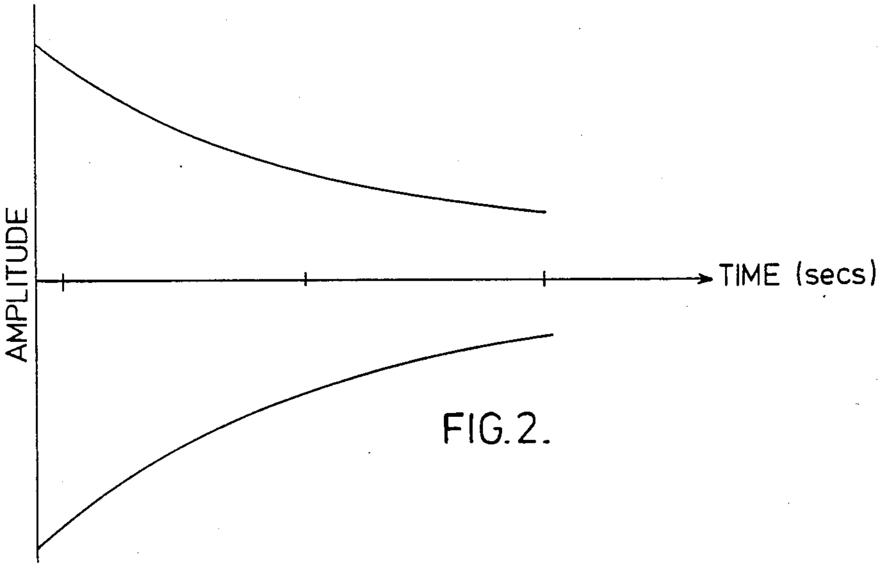
FIG. 2 is a chart showing vibration decay prior to the application of the present invention.

FIG. 2 shows a graph of vibration test conducted on the assembly without any dampers incorporated in the structure. It will be noted that the decay of the vibrations is relatively gradual and extends over the full time frame (approximately one second). It should be apparent that not only is the decay relatively slow but also a very significant number of the oscillations of an amplitude that will have a deleterious effect on the stud i.e. their amplitudes are sufficiently large to be detremental to the stud. In the particular device tested under its normal tension, the natural frequency of the stud was about 310 Hertz thus the graph illustrates about 310 cycles.

Figure 3:
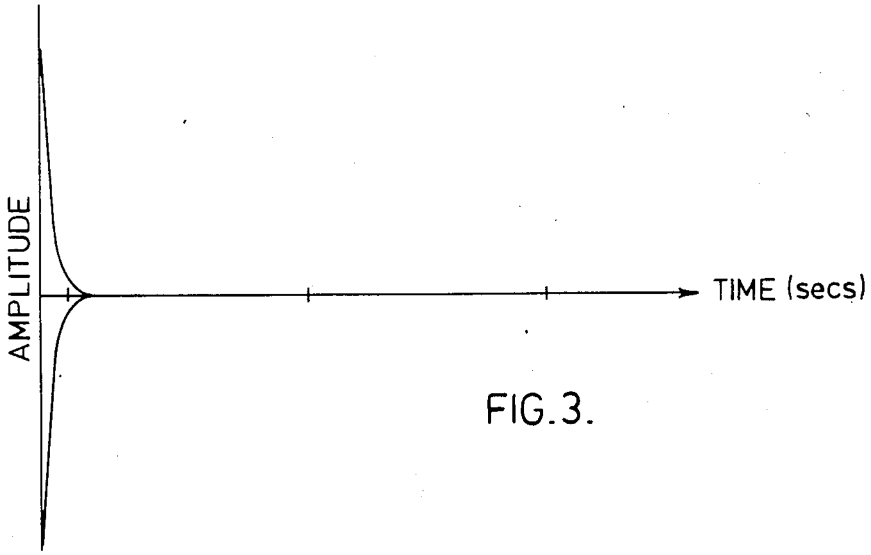
FIG. 3 is a graph showing vibration decay after application of the present invention.

When two dampers were provided the curve was equivalent to that shown in FIG. 3 indicating that the vibrations decayed very rapidly and that very few of the vibrations had amplitudes that would have any significant effect on the fatigue life of the stud.

The graph shown in FIG. 3 was generated when a four inch damper was applied adjacent the flange nut end of the stud using 3 thicknesses of shrink tubing to provide a damper 0.90 inches in radial thickness and a clearance with the passage of 0.009 inches. It will be apparent that the vibration decayed very rapidly and that the vibration amplitudes are substantially negligible within about 0.1 second after impact.

In a modified arrangement, a stud having an effective length of 20.5 inches, a pair of dampers were used each one inch in axial length with the adjacent edges of the dampers spaced $12\frac{1}{2}$ inches and the damper adjacent the flange nut spaced therefrom by a distance of approximately two and thirteen sixteenths inches.

This arrangement proved to be very effective in damping of the vibrations and extending stud life. In a similar arrangement, but with no damping members, the stud failed in fatigue in seven hours or $7\times10^6$ cycles, but when tested for the equivalent of $750\times10^6$ cycles on the modified arrangement with the pair of dampers in place, no sign of metal fatigue was evidenced.

It has also been found that with only a

Case 2881 single damper is used it is about 95 to 98 percent as effective as a pair of dampers.

Having described the invention,modifications will be evident to those skilled in the art without departing from the spirit of the invention as defined in the appended claims.

I claim as new and desire to secure by Letters Patent of the United States of America is:

1. An electric commutator comprising:

a plurality of commutator bars arranged in side-by-side relationship;

an annular shell holding one end of each of said bars and a clamp ring holding the opposite ends of said bars; said annular shell and said clamp ring each defining a plurality of axially extending passages therethrough and spaced from one another around said annular shell and said clamp ring respectively, a passage in said shell being in axial alinement with a respective passage in said ring and forming together a pair of passages;

a commutator stud extending through each said pair of passages and adapted to force said clamp ring towards said shell thereby to clamp said bars between said shell and said clamp ring, each said stud having a clearance between itself and each said passage of the pair of passages through which it passes, and a resilient damper means encircling each said stud, at least a significant portion of each of said damper means positioned inside at least one of said passages and being spaced from each axial end of said stud, each said damper means having an outside diameter permitting movement of said stud through said pair of passages, said damper means accommodating misalinement of said stud with said passages to facilitate assembly of said commutator; the clearance between each said damping means and the inside diameter of the passage in which it is positioned being sufficiently small that said damping means engages the wall of said passage in which it is positioned and is compressed in a manner to dampen vibrations set up in said stud when said commutator is in use.

2. A commutator as defined in claim 1 wherein said damping means is located spaced between 25 and 40 percent of the length of said stud from said one end.

3. A commutator as defined in claim 2 wherein two said damping means are provided on each said stud, one located in each passage of said pair of passages through which said stud passes.

4. A commutator as defined in claim 2 wherein said stud is provided with a fixed flange fixed to said stud at said one end thereof.

5. A commutator as defined in claim 1 wherein said damper means has a thickness of 0.40 to 0.125 inches.

6. A commutator as defined in claim 2 wherein said damper means has a thickness of 0.40 to 0.125 inches.

7. A commutator as defined in claim 5 wherein said damper means is between ¾ and 2 inches in length.

8. A commutator as defined in claim 6 wherein said damper means is between ¾ and 2 inches in length.

* * * * *